United States Patent [19]

Schwartz et al.

[11] Patent Number: 4,471,180

[45] Date of Patent: Sep. 11, 1984

[54] MULTI-CIRCUIT SWITCH APPARATUS

[75] Inventors: Allen K. Schwartz, Alexandria; Billy R. Jones, Anderson, both of Ind.

[73] Assignee: General Motors Corporation, Detroit, Mich.

[21] Appl. No.: 496,085

[22] Filed: May 19, 1983

[51] Int. Cl.³ .............................................. H01H 5/02
[52] U.S. Cl. .................................. 200/67 F; 200/6 R; 200/67 PK; 335/188; 335/205
[58] Field of Search .................... 200/67 F, 67 G, 68, 200/153 A, 340, 61.45 M, 6 R, 67 PK; 335/188, 205–208

[56] References Cited

U.S. PATENT DOCUMENTS

| | | | |
|---|---|---|---|
| 3,194,912 | 7/1965 | Mink | 200/67 F |
| 3,210,486 | 10/1965 | Holzer | 200/67 F |
| 3,222,474 | 12/1965 | Fasola, Jr. | 200/67 F |
| 3,243,542 | 3/1966 | Maxwell | 335/207 |
| 3,263,044 | 7/1966 | Wintriss | 335/207 |
| 3,718,783 | 2/1973 | Kemenczky | 200/1 R |
| 4,246,452 | 1/1981 | Chandler | 200/5 A |
| 4,323,744 | 4/1982 | Sheridan et al. | 200/153 CB |

Primary Examiner—Stephen Marcus
Assistant Examiner—Ernest G. Cusick
Attorney, Agent, or Firm—Robert M. Sigler

[57] ABSTRACT

Electrical multi-circuit switch apparatus includes a flat flux plate and a pyramid-shaped magnet having a base and three or more triangular faces defining intersecting edges, outer edges and an apex. The flux plate is fixed in a molded base in a depression with substantially vertical walls and electrical terminals having portions on said walls. The magnet carries spring arm contacts on its outer edges and is free to rotate, with respect to the flux plate, about whichever intersecting edge contacts the flux plate between stable positions in each of which one of said faces abuts the flux plate for maximum magnetic attraction. The movement is initiated by a downward force at a predetermined location on the base of the magnet and occurs with a magnetic snap action, moving said spring arm contacts in a vertical rocking motion to change the electrical connections between said terminals in a predetermined manner. The apparatus is shown in an automotive exterior lamp control.

3 Claims, 12 Drawing Figures

MULTI-CIRCUIT SWITCH APPARATUS

BACKGROUND OF THE INVENTION

This invention relates to multi-circuit switch apparatus of the type having positive or snap action movement between positions and particularly of the type using permanent magnet apparatus to effect such positive or snap action movement. Such magnetic snap action switches provide positive switching and desirable operator "feel".

This invention provides such switch apparatus for the control of multiple circuits while providing for pushbutton actuation of the multiple circuit apparatus. The ability of the invention to provide a variety of predetermined multiple circuit switch configurations through each single pushbutton actuation provides a simplicity of operation which combines with the positive magnetic snap action to yield a switch apparatus notable for ease of use and reliability.

This invention further provides a simple and reliable construction in which a single pair of magnetically attractive members is movable by means of pushbutton or similar actuators between a plurality of predetermined positions; and one member of the pair carries a first set of contact members which engage a second set of contact members, stationary with respect to the other member of the pair, in a plurality of planes for multiple circuit control. The magnetically attractive members comprise a flat metallic flux plate and a permanent magnet having a pyramid shape with an apex adjacent said flux plate. Said flux plate and permanent magnet, being magnetically attractive to each other, exhibit a plurality of stable positions in which substantial portions of the flux plate abut the different triangular faces of the pyramid-shaped permanent magnet; and each said position defines a switch configuration for the contact members. A force applied to one of a plurality of predetermined points on the movable one of said flux plate and pyramid-shaped permanent magnet, said force being sufficient to overcome the attraction of said contacting surfaces, will cause that member to move with a snap action to a predetermined new stable configuration in which a different face of said pyramidal permanent magnet engages a portion of said flux plate and said contacts assume a new predetermined configuration. Further details and advantages of this invention will be apparent from the accompanying drawings and following description of a preferred embodiment.

DESCRIPTION OF THE PREFERRED EMBODIMENT

Figure 1:
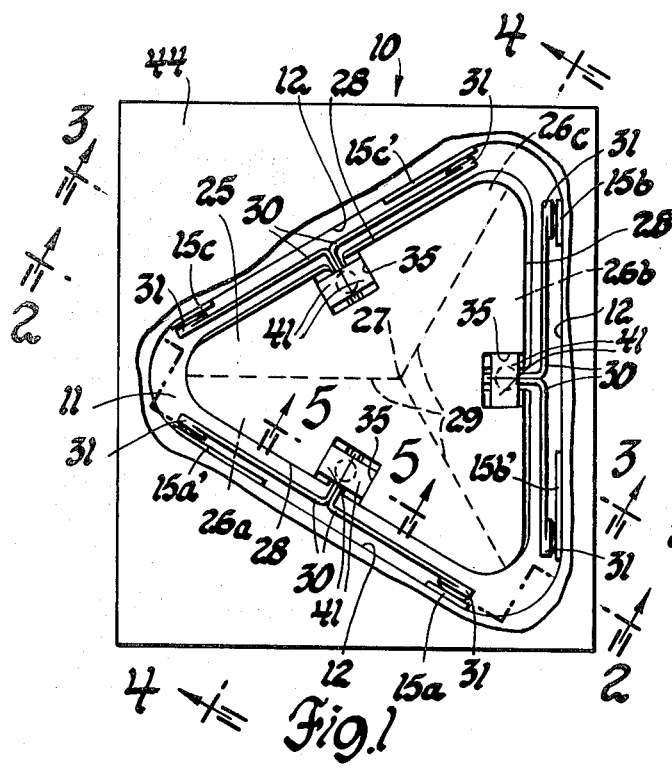
FIG. 1 shows a top view of a preferred embodiment of this invention.

FIG. 1 is a top view, with the cover plate removed, of a switch apparatus according to this invention. The apparatus first comprises a terminal back member 10 molded of an insulating material such as nylon (R) and having a central triangular depression 11 bounded by vertical walls 12. A plurality of electrically conducting copper terminals, all of which have reference numerals starting with 15, are disposed against walls 12 and project outwardly through the bottom 16 of terminal back 10, as shown in FIGS. 1-4.

Figure 3:
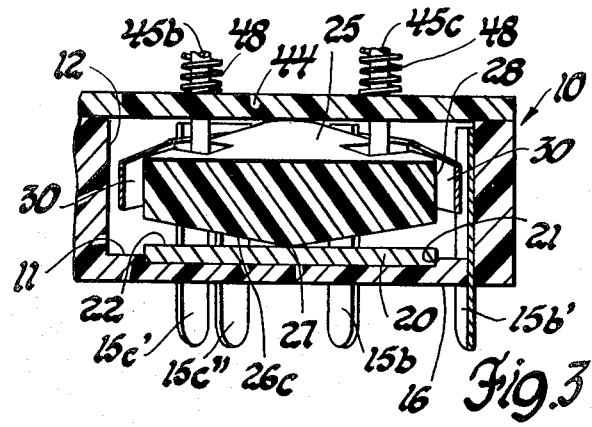
FIG. 3 shows a side cutaway view along lines 3—3 in FIG. 1.

A triangular flux plate 20 made of cold rolled steel is affixed to the bottom of depression 11 in any known and appropriate manner. For example, flux plate 20 may be press-fit into a similarly shaped depression 21 as shown in FIG. 3 or may be attached by an adhesive. Those skilled in the art will recognize numerous ways of fastening flux plate 20 to the bottom of depression 11 in terminal back 10. Flux plate 20 has an upper flat surface 22.

Figure 4:
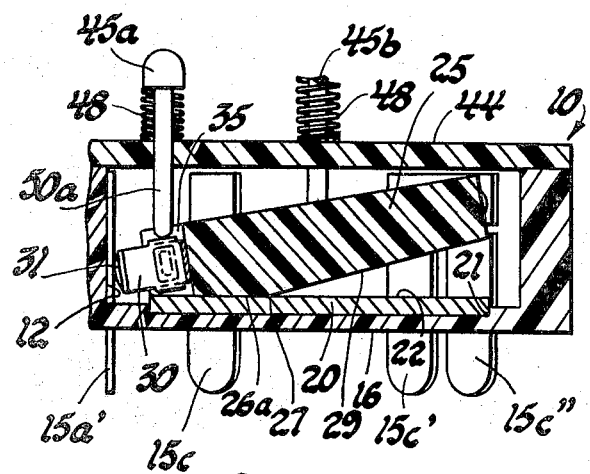
FIG. 4 shows a side cutaway view along lines 4—4 in FIG. 1.
Figure 9:
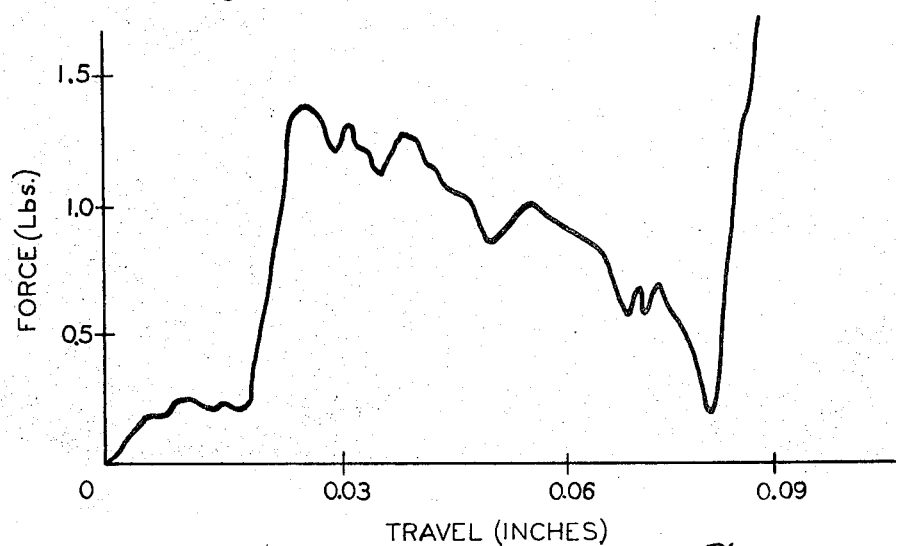
FIG. 9 shows the relationship between applied force and switch travel for the switch of this invention.

Pivoting on surface 22 of flux plate 20 is a permanent magnet 25 having a lower surface 26 in a pyramidal shape comprising a plurality of essentially flat faces or sides 26a, 26b and 26c which meet in an apex 27 abutting upper surface 22 of flux plate 20 and further define intersecting edges 29. Permanent magnet 25 is molded of a magnetic material such as barium ferrite and may be provided with sufficient thickness, as shown in FIGS. 3 and 4, to provide the required magnetic field strength for operation of the switch mechanism as described below. Actually, since pure barium ferrite is known to be somewhat brittle, it may be mixed and molded with a plastic binder in the preferred embodiment for ease of handling in manufacture and assembly. Permanent magnet 25 and flux plate 20 together comprise a magnetic flux circuit in which the reluctance changes greatly in a direction to increase the magnetic attraction when one of the surfaces 26a, 26b or 26c is in flush contact with the upper surface 22 of flux plate 20. Thus, the combination of permanent magnet 25 and flux plate 20 is characterized by a plurality of stable positions, each of which comprises one of the surfaces 26a, 26b and 26c in flush contact with surface 22 of flux plate 20. A certain force is required to move the combination out of one of said stable positions by pivoting magnet 25 about one of the intersecting edges 29 contacting flux plate 20; and once this force is exceeded, the combination tends to move with a snap action to another one of said stable positions as shown in FIG. 9. This behavior provides the snap action of the switch mechanism, as the permanent magnet is rocked in different non-parallel directions about its apex.

Permanent magnet 25, on each outer edge 28 thereof, carries a pair of spring arms 30 which are attached to the edge of permanent magnet 25 near the center thereof and extend both outwardly along edge 28 and away therefrom to hold contact members 31 against terminals 15. As permanent magnet 25 is rocked among its various stable positions with respect to flux plate 20, the contact members 31 are moved essentially vertically in the perspective of FIG. 2 between or across the various terminals 15, while the spring force of the arms is sufficient to maintain contact between contact members 31 and terminals 15 during the movement and afterwards.

Figure 5:
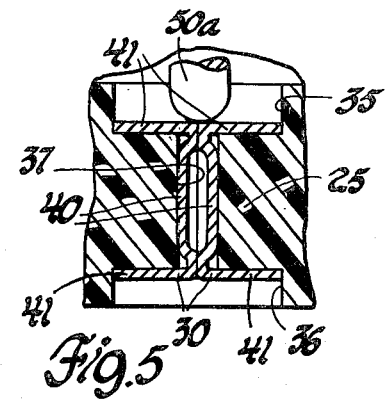
FIG. 5 shows a side cutaway view along lines 5—5 in FIG. 1.

The detail of one method of attachment of spring arms 30 to permanent magnet 25 is shown in FIG. 5. Each edge 28 of permanent magnet 25 is provided with upper and lower depressions 35 and 36, respectively, which open to the edge 28 and extend partly into permanent magnet 25. In this embodiment, edge 28 is also provided with a slot 37 connecting depressions 35 and 36 and also open to edge 28. Each of the spring contactors 30 comprises a portion 40 inserted into slot 37 in a press fit, with portion 40 further including a pair of tangs 41 bent over the bottoms of depressions 35 and 36 to help retain spring contact 30 in slot 37.

Figure 2:
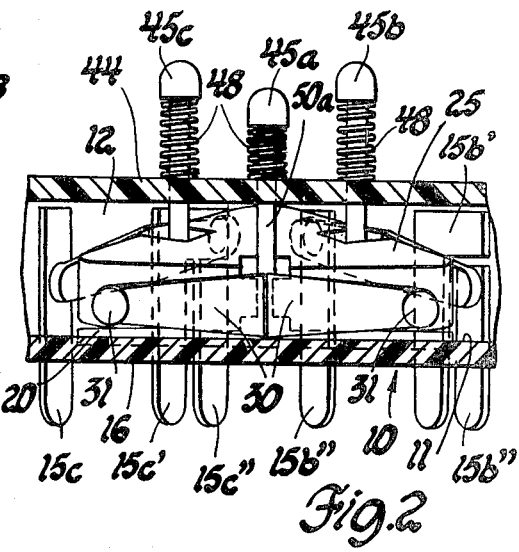
FIG. 2 shows a side cutaway view along lines 2—2 in FIG. 1.

The preferred method of moving the switch apparatus from one of its stable positions to another is to apply a force to the top of the permanent magnet 25 at a point opposite the lower surface face which it is desired to bring into flush contact with upper surface 22 of flux plate 20 and sufficiently far outward from apex 27 to exert a predetermined required torque about apex 27 for operation. In this embodiment, a simple pushbutton arrangement is shown, which provides a pushbutton for each stable position carried on a top plate 44 attached to the top of terminal back member 10 to enclose the triangular depression 11. Pushbuttons 45a, 45b and 45c are shown in FIG. 2 projecting through top plate 44 with return springs 48. Each of the pushbuttons 45a, 45b and 45c has a lower extension such as extension 50a in FIG. 4 which extends downward into one of the upper depressions 35 of permanent magnet 25. This depression is at the maximum possible distance outward from apex 27 and further provides a metal surface in portions 41 of arms 30 for the contact by extension 50a to reduce wear on magnet 28. FIGS. 2 and 4 show pushbutton 45a depressed so that lower extension 50a has abutted the tangs 41 in one of the upper depressions 35 of permanent magnet 25 and has caused lower surface 26a of permanent magnet 25 to come into flush contact with upper surface 22 of flux plate 20. Upon release of pushbutton 45a, return spring 48 associated with that pushbutton will raise it to the level of the other pushbuttons shown in FIG. 2. Either of the other pushbuttons, 45b or 45c, will then be effective to move the switch apparatus to a different stable configuration.

Figure 6A:
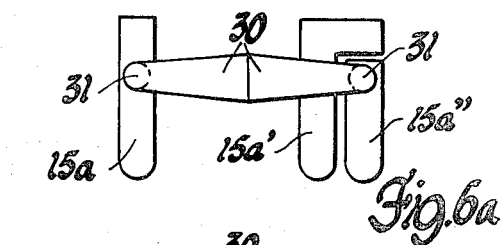
FIGS. 6a, 6b, and 6c show the possible contact configurations for one set of contacts in the apparatus shown in FIG. 1.
Figure 6B:
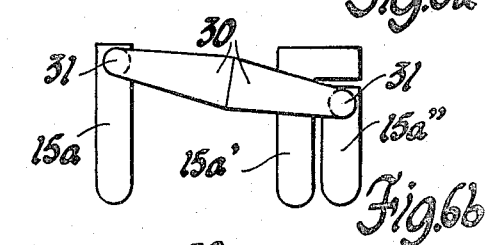
Figure 6C:
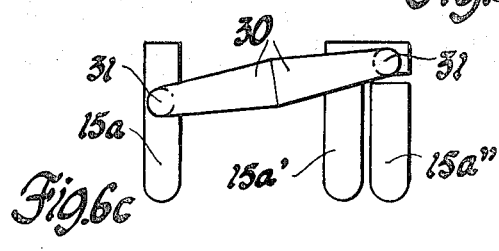

FIGS. 6a–6c show the terminal and contactual configurations of the embodiment of FIGS. 1–5. Each vertical wall 12 of terminal back member 10 is provided with three terminals or contacts, such as terminals 15a, 15a' and 15a'' in FIG. 6a. Each of the terminals has a lower end which projects from the back or bottom of terminal back member 10 for connection to electrical connector means of some type; and terminals 15a and 15a'', at opposite ends of the vertical wall 12 equidistant from the center thereof, are both straight terminal strips disposed normally to the upper surface of flux plate 20. Terminal 15a projects farther upward along vertical wall 12 than does terminal 15a''. Terminal 15a' is disposed beside terminal 15a'' and parallel thereto but has an "L" shape with an upper arm which extends over the top of terminal 15a''. The movement of the switch apparatus is such that contact members 31 are moved vertically along terminal 15a or between terminals 15a'' and the extension of terminal 15a' as the permanent magnet member 25 moves among its stable positions relative to flux plate 20. Positions, shapes and movements are identical for terminals 15b, 15b', 15b'' and terminals 15c, 15c', 15c''. FIGS. 6a–6c show the positions of a single set of contacts in the three stable positions of the switch apparatus shown in FIGS. 1–5. FIGS. 6a–6c can also be interpreted to be a demonstration of the positions of the three sets of contacts in a single stable position of the switch apparatus position shown in FIGS. 1–5.

Figure 8:
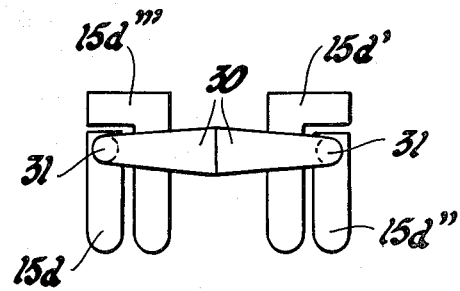
FIG. 8 shows an alternative contact arrangement for use in an alternative embodiment.

It can be seen that a variety of different switching configurations for an electrical circuit are possible with three selectable stable configurations easily selected by actuation of a single pushbutton. With a change in the shape of the flux plate and permanent magnet to, for example, a square shape with a four-faced pyramid and a change in the terminal arrangement to that shown in FIG. 8, greater circuit switching complexity may be controlled between four selectable stable states with four pushbuttons. In FIG. 8, terminals 15d' and 15d'' are identical to 15a' and 15a'' of FIG. 6, but their mirror image is provided as terminals 15d''' and 15d. With a four-sided pyramid magnet, a fourth position in which contactors 31 contact the upper portions of terminals 15d' and 15d''' is possible. It would be obvious to one skilled in the art that it is geometrically possible to increase the number of stable states and circuits controlled by means of increasing the faces of the pyramid and the number of contacts in each set beyond those discussed herein, although practical difficulties may be encountered in manufacturing and using such apparatus with a larger number.

Figure 7A:
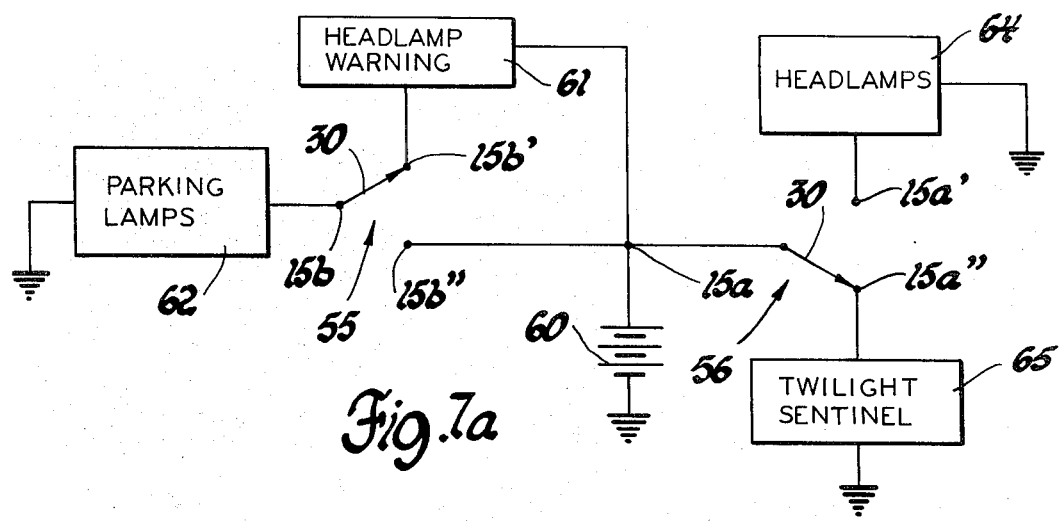
FIGS. 7a and 7b show, respectively, a circuit diagram and a schematic top view of an embodiment of this invention connected to control a motor vehicle external lighting system.
Figure 7B:
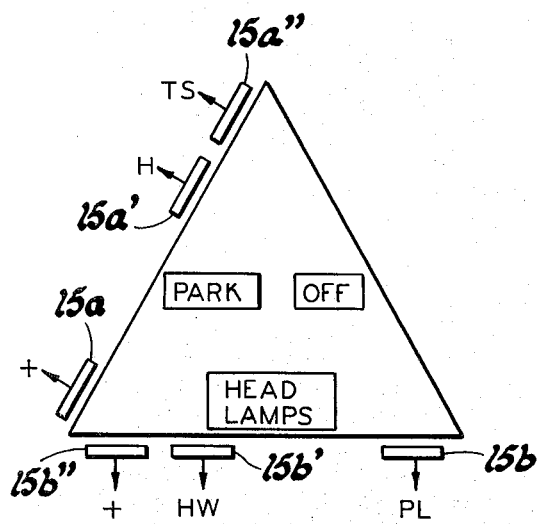

An example of how the switch apparatus of this invention may be used to good advantage is shown in a motor vehicle lamp switching arrangement as shown in FIGS. 7a and 7b. This arrangement uses only two of the three sets of contacts, although all three stable positions of the switching apparatus are required, and accomplishes circuit switching similar to that shown in the Sheridan et al. U.S. Pat. No. 4,323,744, issued Apr. 6, 1982. The motor vehicle battery or alternator 60 is connected through the usual regulator and circuit breaking protectors to terminal 15b'' of one set 55 of contacts, terminal 15a of the other set 56 of contacts and, through a headlamp warning system 61, to terminal 15b' of the first set of contacts. Terminal 15b of the first set of contacts is connected through the parking lamps 62 to ground; and terminal 15a' of the second set of contacts is connected through the headlamps 64 to ground. Terminal 15a'' of the second set of contacts is connected to a Twilight Sentinel ® circuit. The switch configuration of FIG. 7a shows the OFF position which is achieved by pressing down at the area marked OFF in FIG. 7b. In this configuration the headlamp warning circuit is grounded through the parking lamps and the Twilight Sentinel ® 65 circuit is connected to battery 60.

If the switch apparatus is actuated by pressing the PARK area in FIG. 7b, contact 15b of contacts 55 will be connected to contact 15b'' to actuate the parking lamps 62 and eliminate the connection to the headlamp warning circuit, thus rendering the latter active, by its internal circuitry, to signal if the vehicle ignition switch is opened. Further, if the switch apparatus is actuated by pressing the HEAD LAMPS area in FIG. 7b, contact 15a of contacts 56 will be connected to contact 15a' to actuate headlamps 64. In this position the headlamp warning circuit will still be active but the Twlight Sentinel ® will be deactivated. It should be obvious that, rather than a plate member fixed in a base with a pyramid member carrying contact members upside down on top of it as shown in the drawings, one could reverse the members so that the pyramid member is right side up on the base and the plate member, carrying suitably insulated contacts, is on top.

The embodiments of the invention in which an exclusive property or privilege is claimed are defined as follows:

1. Electrical multi-circuit switch apparatus comprising, in combination:
   a magnetic pyramid member having three or more triangular sides defining an equivalent number of intersecting edges and an apex;
   a magnetic plate member abutting said pyramid member and magnetically attracted thereto, said pyramid and plate members being adapted to pivot relative to each other about said intersecting edges among a plurality of different positions in each of which a substantial portion of said plate member abuts one of the triangular sides of the pyramid member to maximize the magnetic attraction therebetween;
   a plurality of electrical contacts stationary with respect to each side of one of said pyramid and plate members and spaced therefrom;
   a plurality of contact members carried by the other of said pyramid and plate members and adapted to engage selected different combinations of said contacts stationary with respect to the one of said pyramid and plate members in the different positions of said members; and
   actuating means adapted to move said members about said apex from one of said positions to another by applying a force tending to bring the surfaces associated with the desired position together, whereby the switch mechanism moves positively with a magnetic snap action.

2. Electrical multi-circuit switch apparatus comprising, in combination:
   a magnetic pyramid member having a base and three or more triangular sides defining an apex and intersecting edges, each of said sides having a substantially straight outer edge;
   magnetic plate member having a substantially straight outer edge corresponding to each outer edge of the pyramid member, the pyramid and plate members being adapted to pivot relative to each other about said intersecting edges among a plurality of positions in each of which a substantial portion of said plate member abuts one of the triangular sides of the pyramid member to maximize the magnetic attraction therebetween and in which corresponding edges of said pyramid and plate members remain corresponding;
   a plurality of electrical contacts stationary with respect to each edge of said magnetic plate member and having portions in a plane substantially parallel to said edge and spaced therefrom;
   one or more spring arms carried on each edge of the pyramid member, said spring arms comprising electrical contacts adapted to move in said planes and engage predetermined ones of said stationary contacts in predetermined combinations as the magnetic pyramid and plate members are relatively moved among said positions; and
   actuating means adapted to move said pyramid member to a predetermined position with respect to said plate member by applying a force to said pyramid member base at a point opposite the one of the triangular sides abutting the plate member in said position, the force being sufficient to overcome the magnetic attraction between the pyramid and plate members in the position from which they are to be moved, whereby such movement occurs with a magnetic snap action.

3. Electrical multi-circuit switch apparatus comprising, in combination:
   a molded base having a flat-bottomed depression with N substantially vertical sides, where N is three or more;
   a magnetic plate member affixed to said flat bottom;
   a plurality of electrical terminals associated with each of said sides, at least two of said terminals of each side having portions horizontally separated on said side;
   a magnetic pyramid member having a base and N traingular faces, said faces defining N intersecting edges, N outer edges and an apex, said pyramid member being situated with said apex adjacent said plate member and being adapted to pivot about whichever of said intersecting edges contacts said plate member among N stable positions in each of which one of said triangular faces abuts the plate member for maximum magnetic attraction therebetween;
   electrically conducting spring arm apparatus carried by each outer edge, each said spring arm apparatus carrying at least two electrical contacts spring biased against one of said depression sides and adapted to make and break contact between the terminal portions on said side in a predetermined manner by vertical rocking movement as the pyramid member is moved among its stable positions; and
   actuating means effective to apply downward force on the base of said pyramid member in any of N locations, each said location being vertically above one of said faces so that the downward force tends to move the adjacent face toward the plate member to pivot said pyramid member about one of said intersecting edges into a new stable position with a snap action.

* * * * *